United States Patent
Ma et al.

(10) Patent No.: US 7,817,642 B2
(45) Date of Patent: Oct. 19, 2010

(54) MOCA FRAME BUNDLING AND FRAME BURSTING

(75) Inventors: Tracy Xiaoming Ma, Westford, MA (US); Francesco Caggioni, Winchester, MA (US)

(73) Assignee: Applied Micro Circuits Corporation, San Diego, CA (US)

(*) Notice: Subject to any disclaimer, the term of this patent is extended or adjusted under 35 U.S.C. 154(b) by 477 days.

(21) Appl. No.: 11/825,087

(22) Filed: Jul. 3, 2007

(65) Prior Publication Data

US 2009/0010263 A1    Jan. 8, 2009

(51) Int. Cl.
 *H04L 12/56* (2006.01)
(52) U.S. Cl. .................. 370/395.4; 709/236
(58) Field of Classification Search .......... 370/389, 370/395.4, 394, 395, 1, 395.21, 395.64, 412, 370/413, 477; 709/236, 226, 233
See application file for complete search history.

(56) References Cited

U.S. PATENT DOCUMENTS

| | | | | |
|---|---|---|---|---|
| 5,884,037 A * | 3/1999 | Aras et al. | ............... | 709/226 |
| 6,671,260 B1 * | 12/2003 | Engstrand | ............... | 370/238 |
| 6,898,755 B1 * | 5/2005 | Hou | ............... | 714/784 |
| 2002/0019966 A1 * | 2/2002 | Yagil et al. | ............... | 714/752 |
| 2003/0072289 A1 * | 4/2003 | Yuang et al. | ............... | 370/338 |
| 2005/0238016 A1 * | 10/2005 | Nishibayashi et al. | ....... | 370/389 |
| 2006/0161663 A1 * | 7/2006 | Palm | ............... | 709/227 |
| 2007/0204314 A1 * | 8/2007 | Hasek et al. | ............... | 725/100 |
| 2007/0217436 A1 * | 9/2007 | Markley et al. | ............... | 370/401 |
| 2008/0043644 A1 * | 2/2008 | Barkley et al. | ............... | 370/261 |
| 2008/0273591 A1 * | 11/2008 | Brooks et al. | .......... | 375/240.01 |

\* cited by examiner

*Primary Examiner*—Aung S Moe
*Assistant Examiner*—Curtis A Alia
(74) *Attorney, Agent, or Firm*—Law Office of Gerald Maliszewski; Gerald Maliszewski

(57) ABSTRACT

A system and method are provided for aggregating Multimedia over Coax Alliance (MoCA) Medium Access Control (MAC) frames. The method sends a Multiframe Reservation Request (MRR) requesting a transmission time slot, and receives a grant in response to the MRR. Subsequent to sending the MRR, a plurality of MoCA MAC frames are accepted and assembled into a physical layer (PHY) burst packet that is transmitted in the granted time slot. A method is also provided for bundling client data packets into a MoCA MAC frame. The method sends a Bundledpacket Reservation Request (BRR) requesting a transmission time slot, and receives a grant in response to the BRR. Subsequent to sending the BRR, a plurality of client data packets are accepted and concatenated into a bundled MoCA MAC frame. The bundled MoCA MAC frame is transmitted in a PHY packet in the granted time slot.

24 Claims, 9 Drawing Sheets

MOCA FRAME BUNDLING AND FRAME BURSTING

BACKGROUND OF THE INVENTION

1. Field of the Invention

This invention generally relates to digital communications and, more particularly, to a system and method for increasing throughput and reducing latency in a Multimedia over Coax Alliance (MoCA) network of connected devices.

2. Description of the Related Art

Consumers are migrating to increasingly complex entertainment technologies such as digital video recorders (DVRs) and high-definition television (HDTV) content, delivered via cable and satellite. The popularity of time-shifted viewing, as permitted by a VCR, is creating a demand for multi-room solutions that enable recorded content to be served from a common hard-drive based DVR and watched in any room in the house. However, the primary driver behind operator-installed entertainment networks is the transition from single HDTV households to multiple HDTVs per home.

The absence of an entertainment network currently requires operators to employ analog distribution to enable whole-home DVR functionality. Analog video distribution can provide a relatively simple solution to whole-home DVR and allows content to be accessed by other TVs in the home without requiring separate decoding of the digital video signal. However, this solution severely limits quality and functionality and may require separate coax runs and switches making it an unattractive solution. Distributing recorded high-definition content to secondary TVs within the home requires the content to be down-converted to standard-definition and distributed over the existing coax wiring to other locations within the home.

Despite the many advantages of coaxial cabling as a home networking medium, transmitting packets at high speed over coax does present challenges, as signals transmitted over coax can generate echoes and attenuation. These problems are addressed by the MoCA standard. Cable and satellite operators both carry services over coaxial cabling, but each operates in unique segments of RF spectrum. Home networking technologies operating above 860 MHz are ideally suited to coexist with cable service offerings as they occupy space above both the downstream frequencies used to carry video content and baseband frequencies which carry upstream data traffic from Data Over Cable Service interface Specification (DOCSIS) cable modems. The MoCA spectrum of frequencies also avoids satellite Internet broadband data connectivity through third party operators in the 18-40 gigahertz (GHz) Ka-Band, and the L-Band spectrum used for video services. MoCA's networking technology operates in the open band of spectrum between 860-950 megahertz (MHz).

MoCA nodes are typically able to communicate at data rates of approximately 100 megabits per second (Mbps). A 100 Mbps net data rate provides enough headroom to enable multiple HD and SD streams at peak data rates to coexist on the same network along with voice and data traffic. In addition, a guaranteed 100 Mbps net data rate enables multiple HD and SD streams of "trick-mode" (e.g., fast-forward or reverse) viewing from a central DVR under all but the most extreme circumstances. However, as technologies evolve, a demand for additional bandwidth typically occurs.

As with most other communication systems, MoCA devices are organized in a suite of layered protocols, where a media access control (MAC) layer interfaces between the physical layer (PHY) and upper layers. As conventionally configured, there are limitations in the MoCA MAC throughput. In a MoCA network, the maximum MAC rate is achieved when the user packets are the same size as the maximum transmission unit (MTU) size, which at the time of this writing is 1518 bytes. For smaller size user packets, the effective MoCA MAC throughput drops due to the following reasons:

1. PHY Packet Overhead: the transmission of each PHY packet is pre-pended with a fixed-size PHY Preamble;
2. Overall per-packet protocol overhead. This metric includes the bandwidth request and grant protocol overhead for each packet; and,
3. An additional requirement on the minimum time between the starts of two consecutive packets. The current MoCA standard requires that the minimum transmission time allocated to a packet transmission is to be 52 us. If a request is made for a short packet with a transmission time of less than 52 us, the transmission is followed by an idle time to meet the minimum packet transmission time. The effective MAC rate drops to 10 Mbps for 64-byte packets and 40 Mbps for 256-byte packets, as compared to 135 Mbps for MTU sized (1518-byte) packets.

There is also a latency issue inherent in the MoCA protocols. In a MoCA network, the transmission of a client data packet is store-and-forward. This technique requires the transmitting node to wait for a complete user packet to be received, before a request can be sent and grant received. This process introduces a minimum latency of one media access plan (MAP) cycle, and an average latency of two MAP cycles before the transmission of a user packet. The nominal MAP cycle is 1 ms, and the minimum MAP cycle is greater than 400 us.

It would be advantageous if medium transmission utilization could be improved in a MoCA network and the effective MAC throughput increased for small size packets. It would also be advantageous if the latency through the MoCA network could be reduced.

SUMMARY OF THE INVENTION

The present invention provides system and methods for improvements to MoCA network communications. Bandwidth requests and grants for multiple user data frames can be made in one transaction. A single transaction reduces the overall per-packet protocol overhead, thus increases the effective MAC throughput. The single transaction also reduces the MoCA network latency by allowing bandwidth requests to be made before the user data frames arrive at the node. The invention permits multiple small sized client data frames to be formed into a larger sized payload in a MoCA PHY packet. This PHY burst packet effectively increases the size of transmission in a single PHY packet, thus reducing the PHY Packet Overhead, and at the same time avoids the wasted idle times associated with smaller size packets. The use of a PHY burst packet improves the MAC rate, permitting a maximum feasible throughput.

Accordingly, a method for is provided for aggregating Multimedia over Coax Alliance (MoCA) Medium Access Control (MAC) frames. The method sends a Multiframe Reservation Request (MRR), requesting a transmission time slot, and receives a grant in response to the MRR. Subsequent to sending the MRR, a plurality of MoCA MAC frames are accepted and assembled into a physical layer (PHY) burst packet that is transmitted in the granted time slot.

In one aspect, a determination is made that the destination node is capable of handling a PHY burst packet, and PHY burst packets are only transmitted to nodes with PHY burst packet capability. In another aspect, if MoCA MAC frames are accepted that are addressed to a first plurality of nodes, and if it is determined that each node is capable of handling a PHY burst packet, then the PHY burst packet may be broadcast to the first plurality of nodes.

A method is also provided for bundling client data packets into a MoCA MAC frame. The method sends a Bundled-packet Reservation Request (BRR) requesting a transmission time slot, and receives a grant in response to the BRR. Subsequent to sending the BRR, a plurality of client data packets are accepted and concatenated into a bundled MoCA MAC frame. The bundled MoCA MAC frame is transmitted in a PHY packet in the granted time slot. In one aspect, the amount of received user traffic is estimated and a required bandwidth is calculated. Then, the BRR is sent in response to the required bandwidth calculation.

Additional details of the above-described methods and systems for aggregating MoCA MAC frames and concatenating client data packets into a MAC frame are provided below.

DETAILED DESCRIPTION

Figure 1:
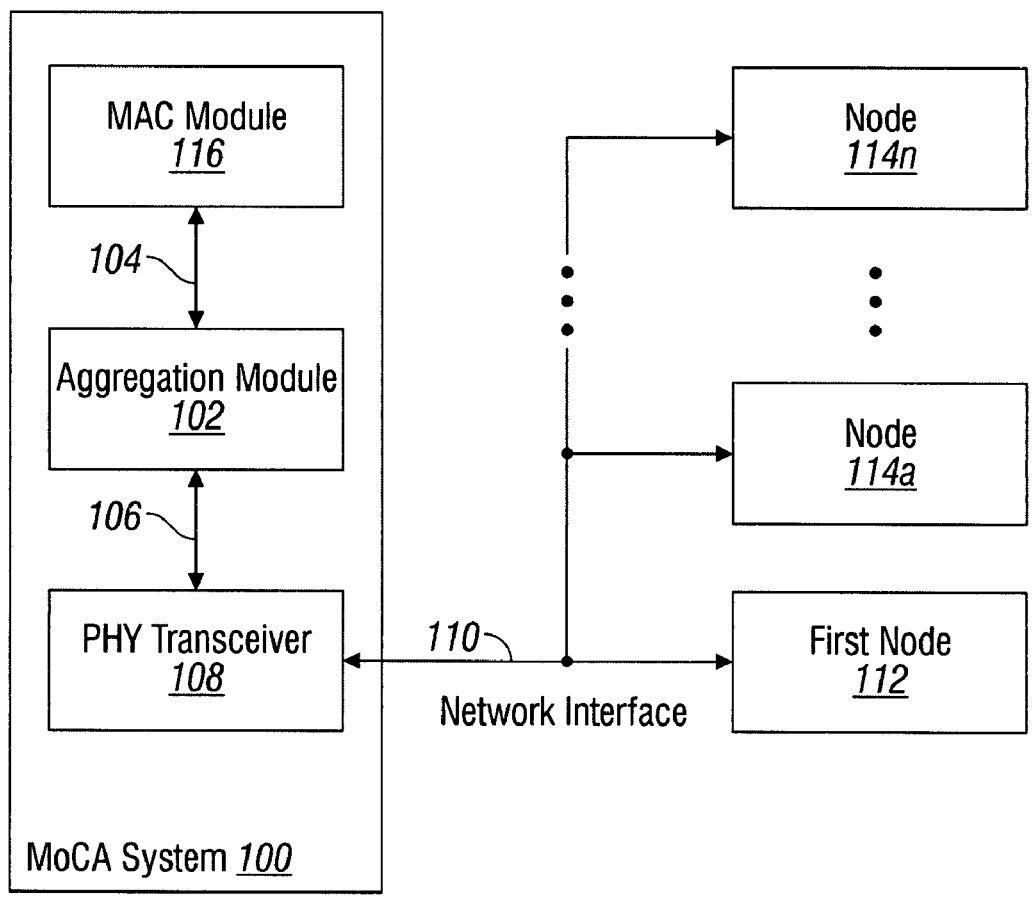
FIG. 1 is a schematic block diagram of a Multimedia over Coax Alliance (MoCA) system for aggregating Medium Access Control (MAC) frames.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "processor", "processing device", "component," "module," "system," and the like are intended to refer to a computer-related entity, either hardware, firmware, a combination of hardware and software, software, or software in execution. For example, a component may be, but is not limited to being, a process running on a processor, generation, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

The various illustrative logical blocks, modules, and circuits that have been described may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the node, or elsewhere. In the alternative, the processor and the storage medium may reside as discrete components in the node, or elsewhere in an access network.

FIG. 1 is a schematic block diagram of a Multimedia over Coax Alliance (MoCA) system for aggregating Medium Access Control (MAC) frames. The system 100 comprises an aggregation module 102 having a PHY layer interface on line 104 to supply a Multiframe Reservation Request (MRR) requesting a transmission time slot, and an MAC layer interface on line 106 to accept a plurality of MoCA MAC frames from MAC module 116. The aggregation module 102 assembles the plurality of MoCA MAC frames and supplies a PHY burst packet at the PHY layer interface on line 106. A PHY transceiver 108 has an interface on line 106 to accept the MRR and the PHY burst packet, and a network interface on line 110 to transmit the physical layer (PHY) burst packet in the a transmission time slot granted in response to the MRR.

Figure 2A:
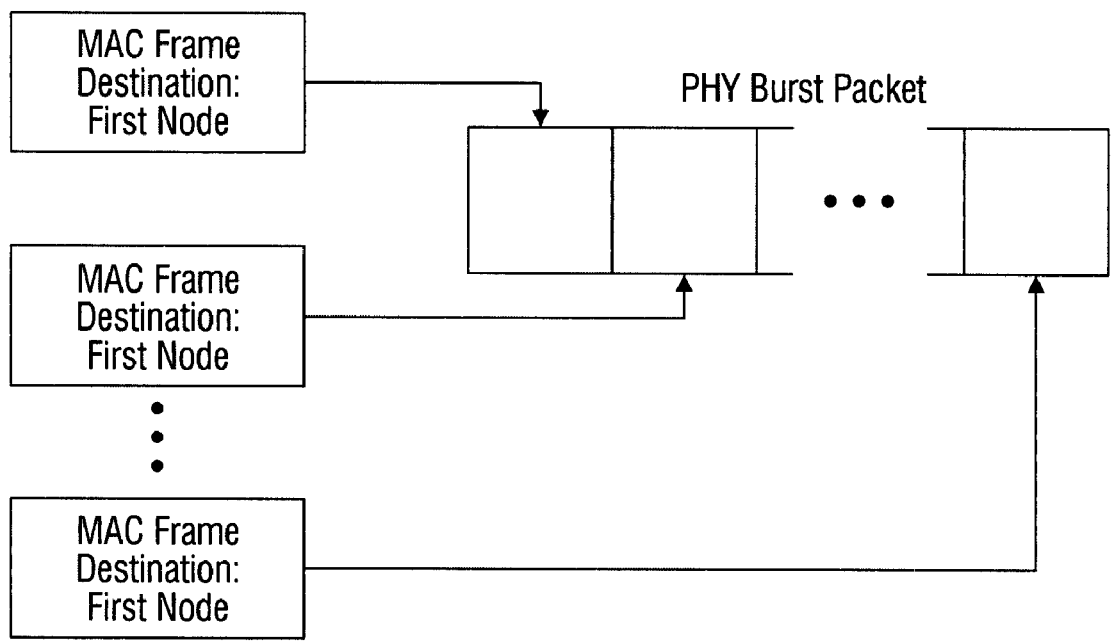
FIGS. 2A and 2B are diagrams depicting the assembly of a PHY burst packet.
Figure 2B:
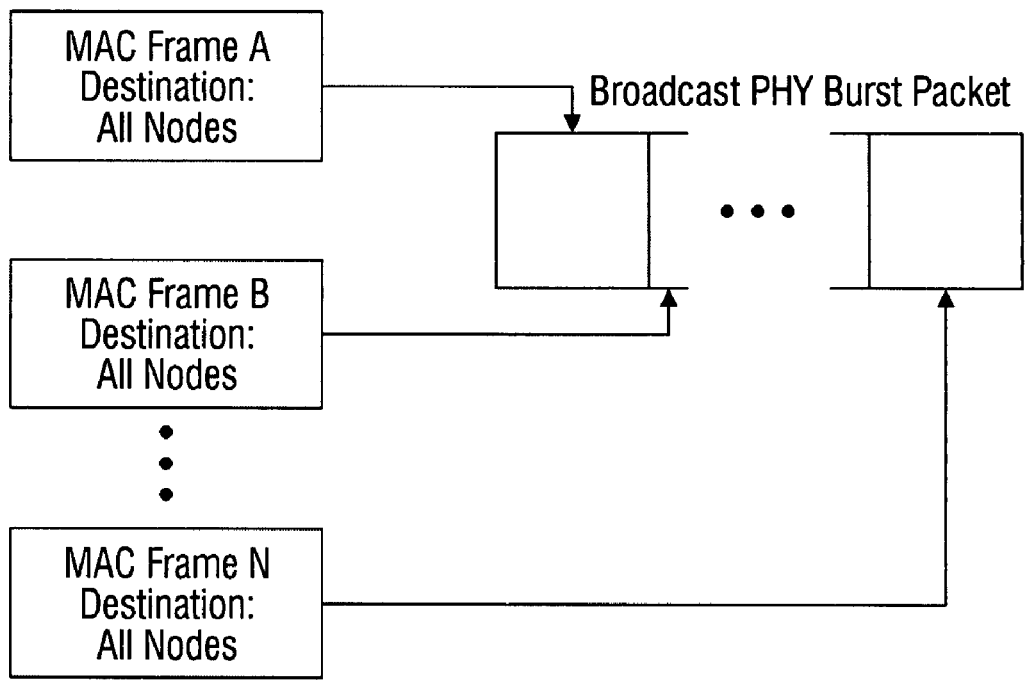

FIGS. 2A and 2B are diagrams depicting the assembly of a PHY burst packet. In one aspect (see FIGS. 2A and 1), the aggregation module 102 accepts a plurality of MoCA MAC frames addressed to a first node 112, and determines that the first node is capable of handling a PHY burst packet. The PHY transceiver 108 transmits the PHY burst packet to the first node. In another aspect (see FIGS. 2B and 1), the aggregation module 102 accepts a plurality of MoCA MAC frames addressed to the entire network (e.g., a first plurality of nodes 112, and 114a through 114n). Note: n is not limited to any particular number. If the aggregation module 102 determines that each node in the first plurality of nodes is capable of handling a PHY burst packet, then the PHY transceiver 108 may broadcast the PHY burst packet to the first plurality of nodes. Here, MAC frames A through N are shown broadcast, where N is not limited to any particular value.

In one aspect, the aggregation module 102 estimates the amount of received user traffic, calculates a required bandwidth, and sends a MRR responsive to the required bandwidth calculation. For example, the aggregation module may estimate the number of client packets of a certain priority that are expected to be received by the source MoCA node in certain period of time. While the conventional MoCA standard only permits the sending of Reservation Request (RR) only after the client packets are received, the MoCA system 100 permits an MRR to be generated in advance, based on the expected client packets rate. For example, a guaranteed rate of service may be established, or a guaranteed rate of service established for a particular class of packets or MAC frames. Then, the PHY transceiver transmits MRRs that insure service at the guaranteed rate.

In another aspect, the aggregation module 102 ranks the accepted MoCA MAC frames in accordance to a priority, and assembles MoCA MAC frames in response to the priority ranking. For example, higher priority client packets and MAC frames may be assembled and transmitted before lower priority MAC frames.

Figure 3:
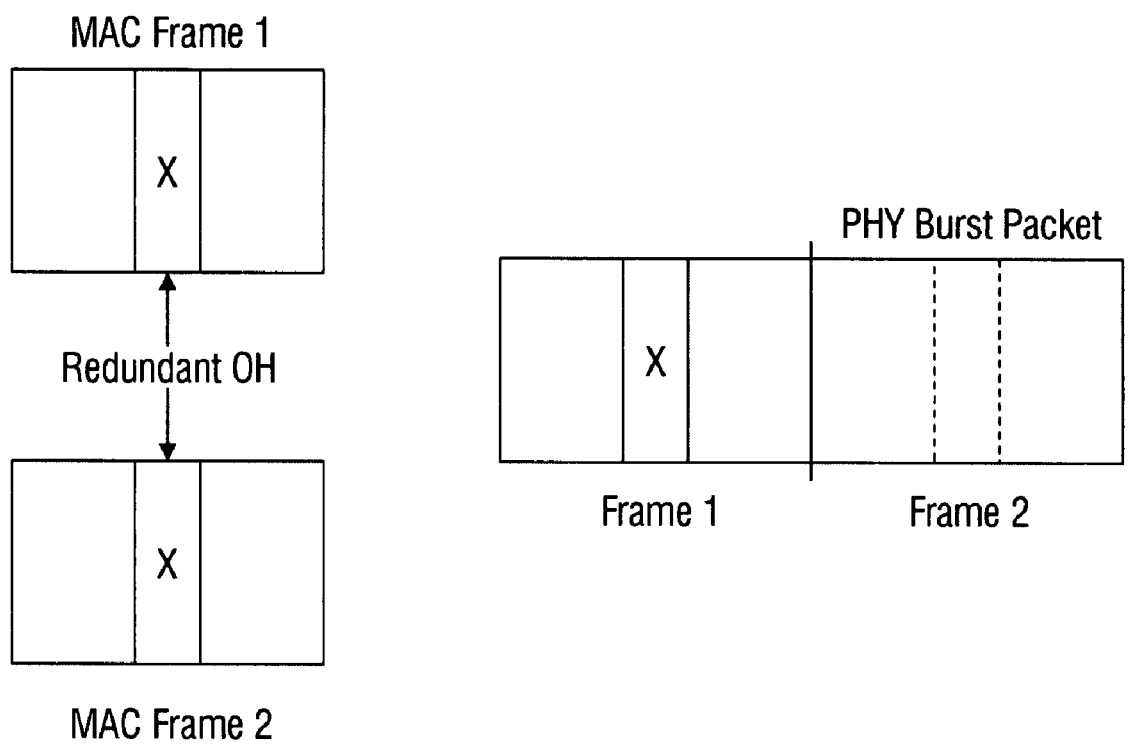
FIG. 3 is a diagram depicting the removal of shared overhead (OH) in a PHY burst packet.

FIG. 3 is a diagram depicting the removal of shared overhead (OH) in a PHY burst packet. To reduce overhead in the PHY burst packet, the aggregation module 102 may determine the existence of common fields shared between MoCA MAC frames, and remove redundant fields from the PHY burst packet during assembly. For example, the 4-byte TRANSMIT_CLOCK field may be removed from the header of all frames after the first frame in the PHY burst packet. Other examples of fields that may be redundant include frame padding, FEC padding, and ACMT symbol padding.

Returning to FIG. 1, the MoCA system 100 typically functions in a receive mode and well as a transmit mode, and the above-mentioned functions are performed in a reverse order. Upon initialization when the MoCA system is joining the network, The PHY transceiver transmits a message advertising PHY burst packet handling capabilities. Subsequently, a PHY burst packet is received from the first node 112. The PHY transceiver 108 supplies the PHY burst packet to the aggregation module 102. The aggregation module 102 disassembles the PHY burst packet, recovers a plurality of MoCA MAC frames, and supplies the plurality of MoCA MAC frames via the MAC layer interface 106.

Figure 4:
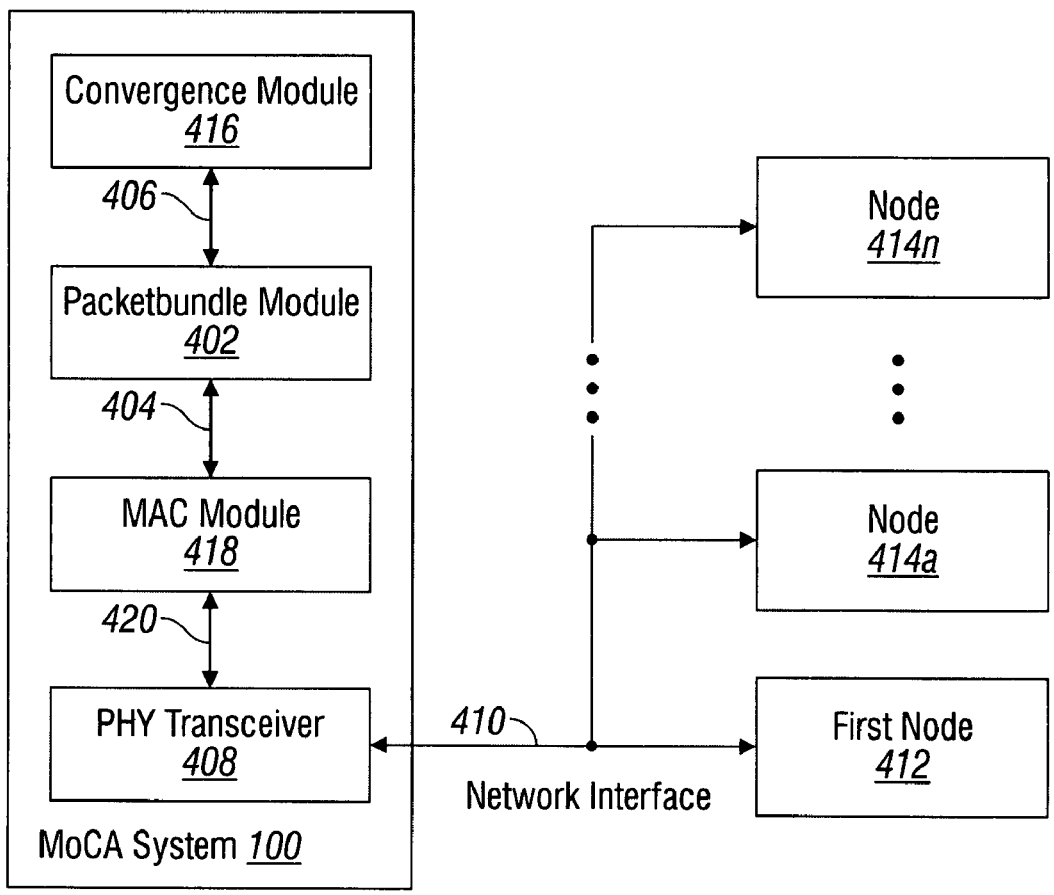
FIG. 4 is a schematic block diagram of a MoCA system for bundling client data packets into a MAC frame.

FIG. 4 is a schematic block diagram of a MoCA system for bundling client data packets into a MAC frame. The system 400 comprises a packetbundle module 402 having a MAC layer interface on line 404 to supply a Bundledpacket Reservation Request (BRR) requesting a transmission time slot, and a convergence layer interface on line 406 to accept a plurality of client data packets from convergence module 416. The packetbundle module 402 concatenates the plurality of client data packets supplied at the MAC layer interface on line 404. A MAC module 418 bundles the concatenated client data packets into a bundled MoCA MAC frame, which is included in a PHY packet. The MAC module 418 passes the BRR and PHY packet via a PHY layer interface on line 420. A PHY transceiver 408 has a MAC layer interface on line 420 to accept the BRR and PHY packet, and a network interface on line 410 to supply the PHY packet in a transmission time slot granted in response to the BRR.

Figure 5A:
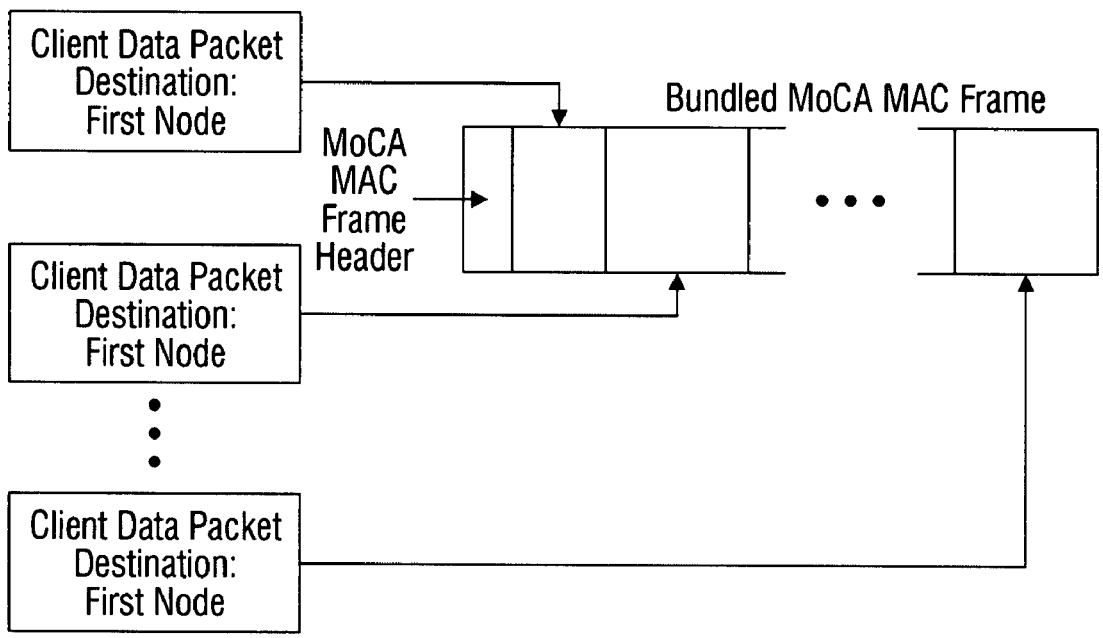
FIGS. 5A and 5B are diagrams depicting the concatenation of client data packets into a MoCA MAC frame.
Figure 5B:
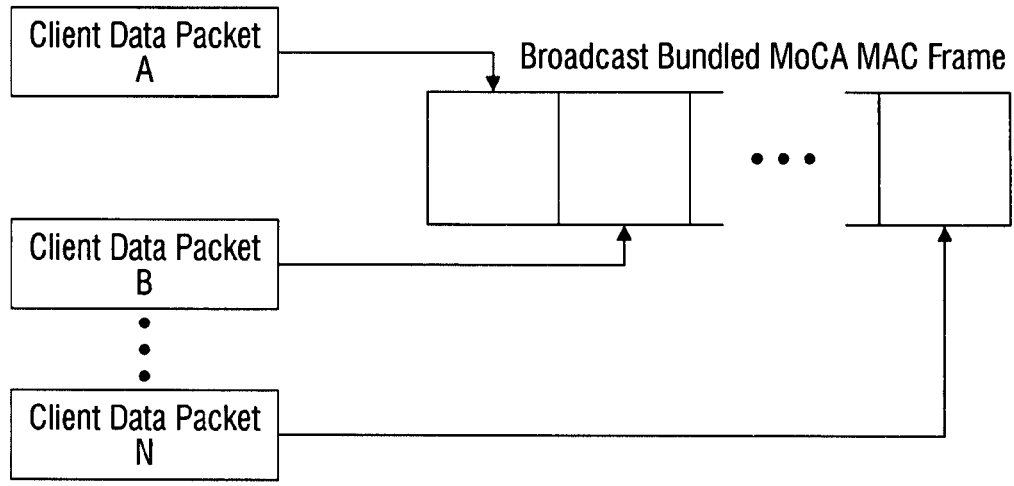

FIGS. 5A and 5B are diagrams depicting the concatenation of client data packets into a MoCA MAC frame. In one aspect (see FIGS. 5A and 4), the packetbundle module 402 accepts a plurality of client data packets destined to a first node 412, and determines that the first node is capable of handling a bundled MoCA MAC frame. If such a determination is made, the PHY transceiver 408 transmits the PHY packet to the first node 412. In another aspect (see FIGS. 5B and 4), the packetbundle module 402 accepts a plurality of client data packets destined to a first plurality of nodes 112, and 114*a* through 114*n* (all the nodes in the network). Again, n is not limited to any particular value. The packetbundle module 402 determines that each node in the first plurality of nodes is capable of handling a bundled MoCA MAC frame, and the PHY transceiver 408 broadcasts the PHY packet to the first plurality of nodes. Here, MAC frames A through N are shown broadcast, where N is not limited to any particular value.

In one variation, the packetbundle module 402 estimates an amount of received user traffic, calculates a required bandwidth, and sends the BRR in response to the required bandwidth calculation. For example, a guaranteed rate of service may be established, or a guaranteed rate of service established for a particular class of client data packets. Then, the PHY transceiver transmits BRRs that insure service at the guaranteed rate.

In another variation, the packetbundle module 402 ranks the accepted client data packets in accordance to a priority, and concatenates the client data packets in response to the priority ranking. For example, higher priority client data packets may be assembled and transmitted before lower priority client data packets. In one more variation, the packetbundle module 402 determines the existence of common fields shared between client data packets and removes redundant fields from the bundled MoCA MAC frame.

As with the system of FIG. 1, the MoCA system 400 typically functions in a receive mode and well as a transmit mode, and the above-mentioned functions are performed in a reverse order. Upon initialization when joining the network, the PHY transceiver transmits a message advertising bundled MoCA MAC frame handling capabilities. Subsequently, the PHY transceiver receives a PHY packet from the first node. The PHY transceiver 408 supplies the PHY packet to the packetbundle module via the MAC module 418, which disassembles the PHY packet. The packetbundle module 402 recovers a plurality of client data packets, and supplies the plurality of client data packets via the convergence layer interface 406.

Although the systems of FIGS. 1 and 4 have been presented as separate and distinct, it should be understood that features from both systems can be combined and used in a single system. It should also be understood that the systems of FIGS. 1 and 4 can be enabled in hardware, in software, or in combinations of the two.

Functional Description

One of the more fundamental restrictions associated with conventional MoCA networks communications stems from the minimum transmission duration for a MoCA frame. Without violating current requirements, so as to be able to continue interoperation with conventional nodes, one solution to the problem entails assembling multiple client data frames into one MoCA MAC frame. There are enough reserved fields in MoCA MAC header to convey information for multiple user frames. This frame bundling function may be enabled by queuing packets on a per-destination basis.

Thus, MoCA MAC frame throughput can be improved by the bundling of small sized packets. Conventional MoCA systems have an inherent limitation, where the effective throughput drops dramatically for smaller size packets. For example, a rate of 10 Mbps for 64-byte packets and 40 Mbps for 256-byte packets is significantly less than the 135 Mbps for 1518-byte packets.

Figure 6:
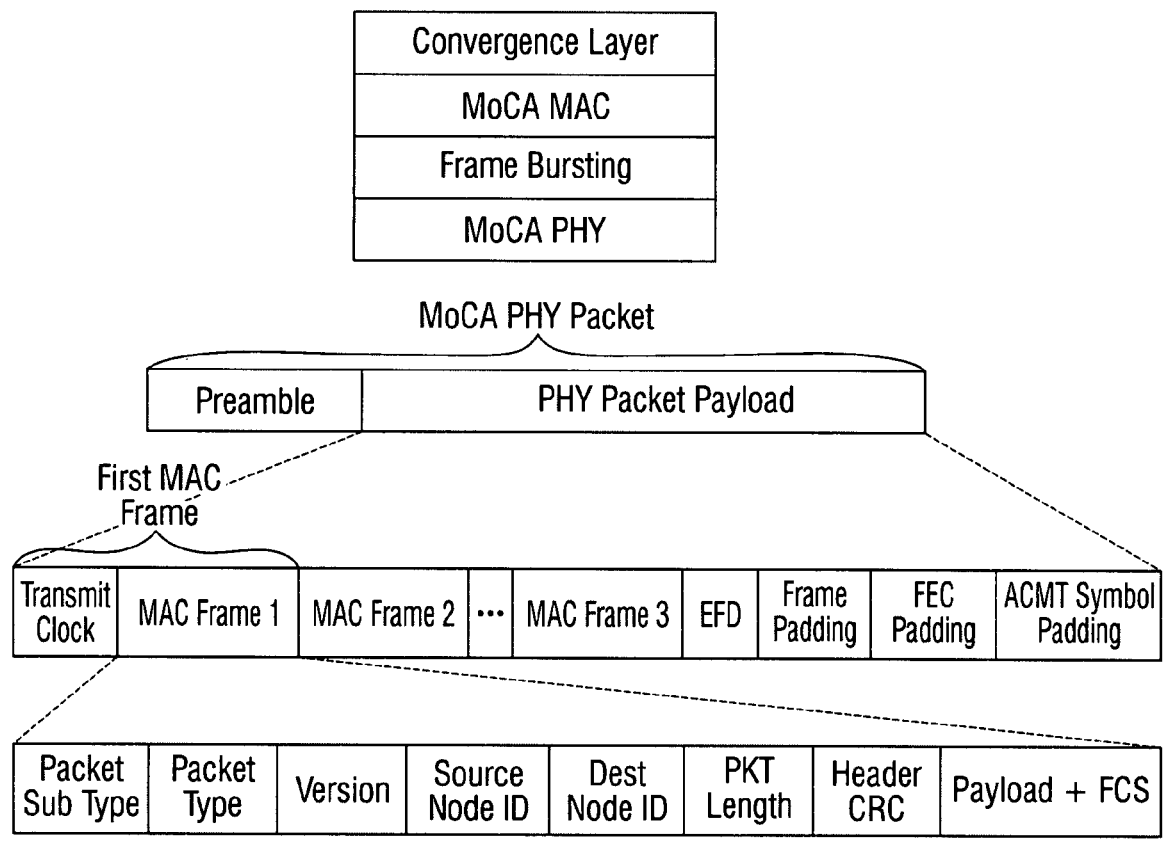
FIG. 6 is a diagram depicting a MoCA PHY burst packet.

FIG. 6 is a diagram depicting a MoCA PHY burst packet. MoCA Frame Bursting is the aggregation of multiple MoCA MAC frames into one MoCA PHY burst packet. The PHY burst packet option permits a MoCA node to request transmission bandwidth for multiple MAC frames in a single request (MRR) and transmit the frame burst in one PHY packet, thus reducing the PHY transmission overhead and protocol overhead. Within the scope of MoCA protocol stack, this function is performed between the MoCA MAC layer and MoCA PHY layer. The Convergence Layer determines the destination MoCA node for the each MoCA MAC frame. Frames destined to the same MoCA node may be aggregated into one MoCA PHY packet for burst mode transmission. The MoCA PHY layer takes multiple MoCA MAC frames and packs them into one MoCA PHY burst packet. The first MAC frame in the burst packet may maintain the conventional MoCA MAC frame format, while all the subsequent MAC frames may be standard MoCA MAC frame, less the 4-byte TRANSMIT_CLOCK field in the header.

Some basic guidelines for Frame Bursting Transmission are as follows:

1. MoCA MAC frames destined to the same MoCA destination node may be aggregated into a burst and transmitted via a single MoCA PHY burst packet. When all nodes in a MoCA network are capable of frame bursting, the frames bursting may applied to a broadcast transmission.

2. The maximum length of the aggregated frames of a burst is typically less than the MTU size MoCA data packet.

3. There is no limitation on the number of frames in one burst transmission. However, the number of packets is typically limited to obtain burst packets having a duration of less than the MTU size.

4. A node makes a bandwidth request for multiple MoCA MAC frames in one Multiframe Reservation Request (MRR) for the aggregated bandwidth of all MAC frames.

5. The node may make bandwidth requests with a configurable payload size in advance of receipt, anticipating new client data packets and MAC frames being received while the node is waiting for the grant to its bandwidth request. The MRR may be used to provide a constant bitrate service and to reduce the latency through the MoCA network. The EFD (End of Frame Delimiter) and Frame Padding field may be appended at the end of the last MoCA MAC frame in a burst to make up the payload length used in the bandwidth request.

The PHY burst packet may be used so that an enabled node maintains backward compatibility with conventional MoCA nodes in the same network. The PHY burst transmissions may occur in the network even if some nodes, including the node operating as the Network Coordinator, are not capable of supporting the same technique.

During the initial Node Admission process, a new node advertises its Frame Bursting Transmission capabilities via a bit in the NODE_PROTOCOL_SUPPORT field. This transmission permits each node in the network learns about the other nodes having the same capability. A Frame Bursting Transmission is used for unicast transmissions between the two nodes that are both capable of the technique. An enabled node communicates with non-capable nodes via the conventional MoCA PHY packet. When all nodes in a MoCA network are capable of Frame Bursting Transmission, a broadcast transmission may be used.

Figure 7:
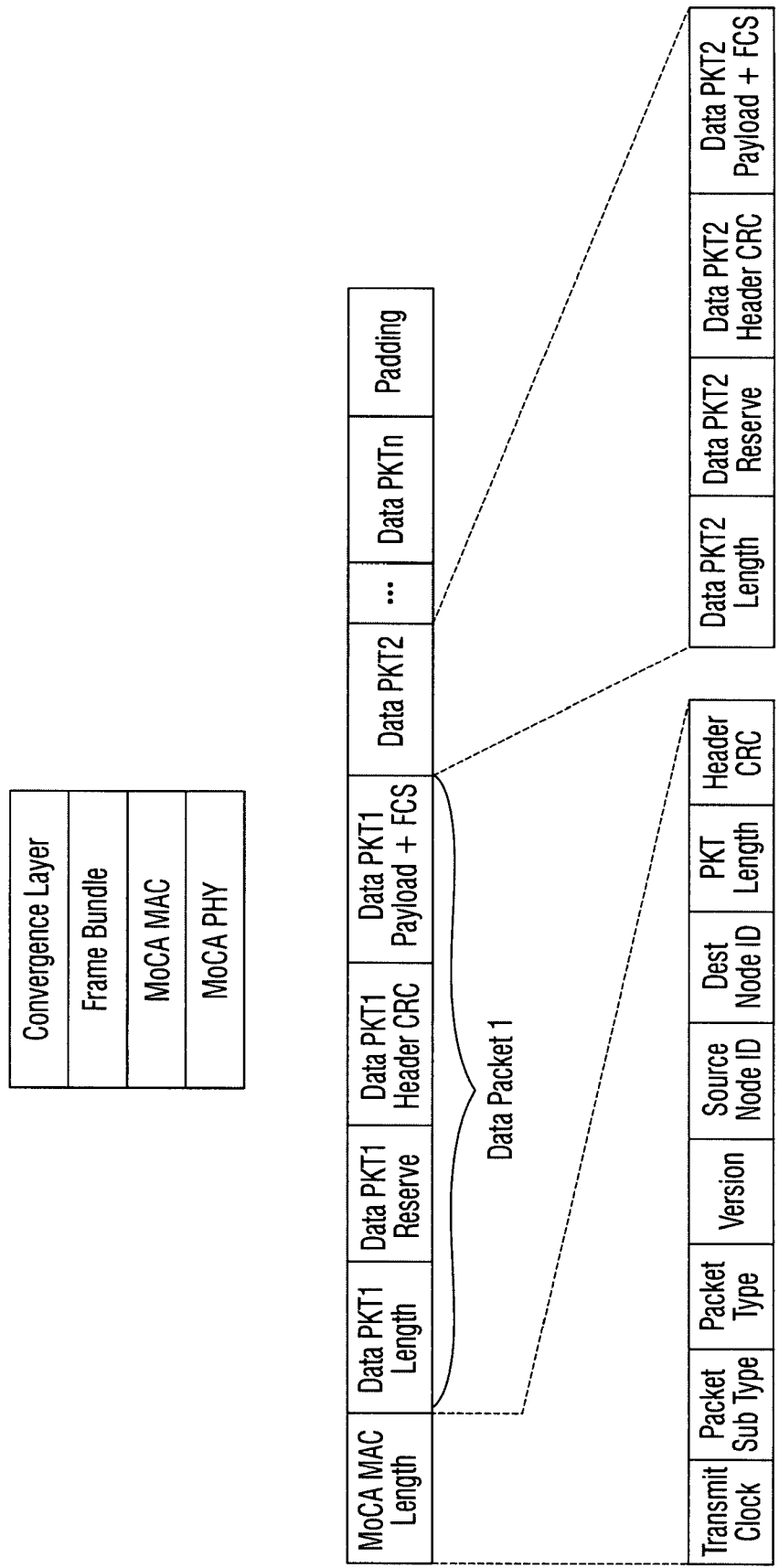
FIG. 7 is a diagram depicting a bundled MoCA MAC frame.

FIG. 7 is a diagram depicting a bundled MoCA MAC frame. A MoCA Frame Bundle, which is also referred to herein as a bundled MoCA MAC frame, concatenates multiple client data packets into one MoCA MAC frame for transmission over the MoCA medium. Within the scope of MoCA protocol stack, this function is performed between the Convergence Layer and MoCA MAC layer. The Convergence Layer determines the destination MoCA node for the client data packets. The packets destined to the same MoCA node may be bundled into one MoCA MAC frame. The MoCA MAC layer treats the bundled client data packets as the frame payload for one MoCA MAC frame. This scheme achieves the maximum utilization over the MoCA medium by significantly reducing the MoCA PHY overhead.

The fields in the modified MoCA MAC Frame are outlined in Table 1 below. The fields modified or amended from the current MoCA standard are accented with italic lettering.

Some basic guidelines for Frame Bundle Transmission are as follows:

1. Frames bundled into a single transmission are typically destined to the same MoCA destination node. When all nodes in a MoCA network are capable of frame bundling, the frame bundle may be broadcast.

2. The maximum length of the bundled frame is typically less than the MTU size of the MoCA data packet.

3. There is no limitation on the number of frames bundled into one transmission, as long as the bundled frame is less than the MTU size.

4. A node makes bandwidth requests for multiple client data packets in one Bundledpacket Reservation Request (BRR) for the aggregated bandwidth of all data packets.

TABLE 1

| Context | Field | Size (bits) | Usage |
| --- | --- | --- | --- |
| MAC Frame Header | TRANSMIT CLOCK | 32 | Same as current standard |
| | PACKET SUBTYPE | 4 | Same as current standard |
| | PACKET TYPE | 4 | Add a new packet type to indicate bundled frame: 0xB - Bundled Ethernet unicast/broadcast |
| | VERSION | 8 | New Version number that indicates the support of Frame Bundle Transmission |
| | RESERVED | 8 | Same as current standard |
| | SOURCE NODE ID | 8 | Same as current standard |
| | RESERVED | 8 | Same as current standard |
| | DESTINATION NODE ID | 8 | Same as current standard |
| | PACKET LENGTH | 16 | Same as current standard. This is the payload length. In a bundled frame, this field |

TABLE 1-continued

| Context | Field | Size (bits) | Usage |
|---|---|---|---|
| | | | still indicates the length of payload portion of the MoCA MAC frame, which covers mutiple client data packetes. |
| | RESEVED | 32 | Same as current standard |
| | HEADER CHECK SEQUENCE | 16 | Same as current standard |
| Packet 1 | DATA PACKET LENGTH | 16 | Length of the client data packet |
| | RESERVED | 16 | This field is reserved for future. It may be used to carry the priority or flow information |
| | PACKET HEARDER CRC-16 | 16 | CRC checksum calculated over the DATA PACKET LENGTH and RESERVED field |
| | PAYLOAD DATA + FCS | Variable | Client data packet and 32-bit payload CRC using the algorithm specified in the IEEE-802.3 specification |
| Packet 2 | DATA PACKET LENGTH | 16 | |
| | RESERVED | 16 | |
| | PACKET HEARDER CRC-16 | 16 | |
| | PAYLOAD DATA + FCS | Variable | |
| . . . | | | |
| Packet N | DATA PACKET LENGTH | 16 | |
| | RESERVED | 16 | |
| | PACKET HEARDER CRC-16 | 16 | |
| | PAYLOAD DATA + FCS | Variable | |
| | PADDING | Variable | Padding bytes if the length of the payload portion of the MoCA frame is less than length indicated in PACKET LENGTH field. |

5. The node may make the bandwidth request for a configurable payload size in advance, in anticipation of new client data packets being received while the node is waiting for the grant to its bandwidth request. The BRR may be used to provide constant bitrate service and to reduce the latency through the MoCA network. A PADDING field may be appended at the end of the MoCA MAC frame to make the payload length the same as the frame size in the bandwidth request.

The bundled MoCA MAC frame may be enabled to be backward compatible, permitting enabled nodes to continue to cooperate with conventional MoCA nodes in the same network. The bundled MoCA MAC frame does not require all nodes, including the node operating as the Network Coordinator, to be capable of supporting the same technique in order to achieve the improvements in the network.

During the initial Node Admission process, the new node advertises its bundled MoCA MAC frame capability via a bit in the NODE_PROTOCOL_SUPPORT filed. In this manner, each enabled node in the network learns about other nodes with the same capability. The bundled MoCA MAC frame is used for unicast transmissions between two nodes that are both capable of the same technique. Enabled nodes communicate with non-capable nodes via a conventional MoCA MAC frame transmission. If all nodes in a MoCA network are capable of bundled MoCA MAC frame transmission, transmissions may be broadcast.

Figure 8A:
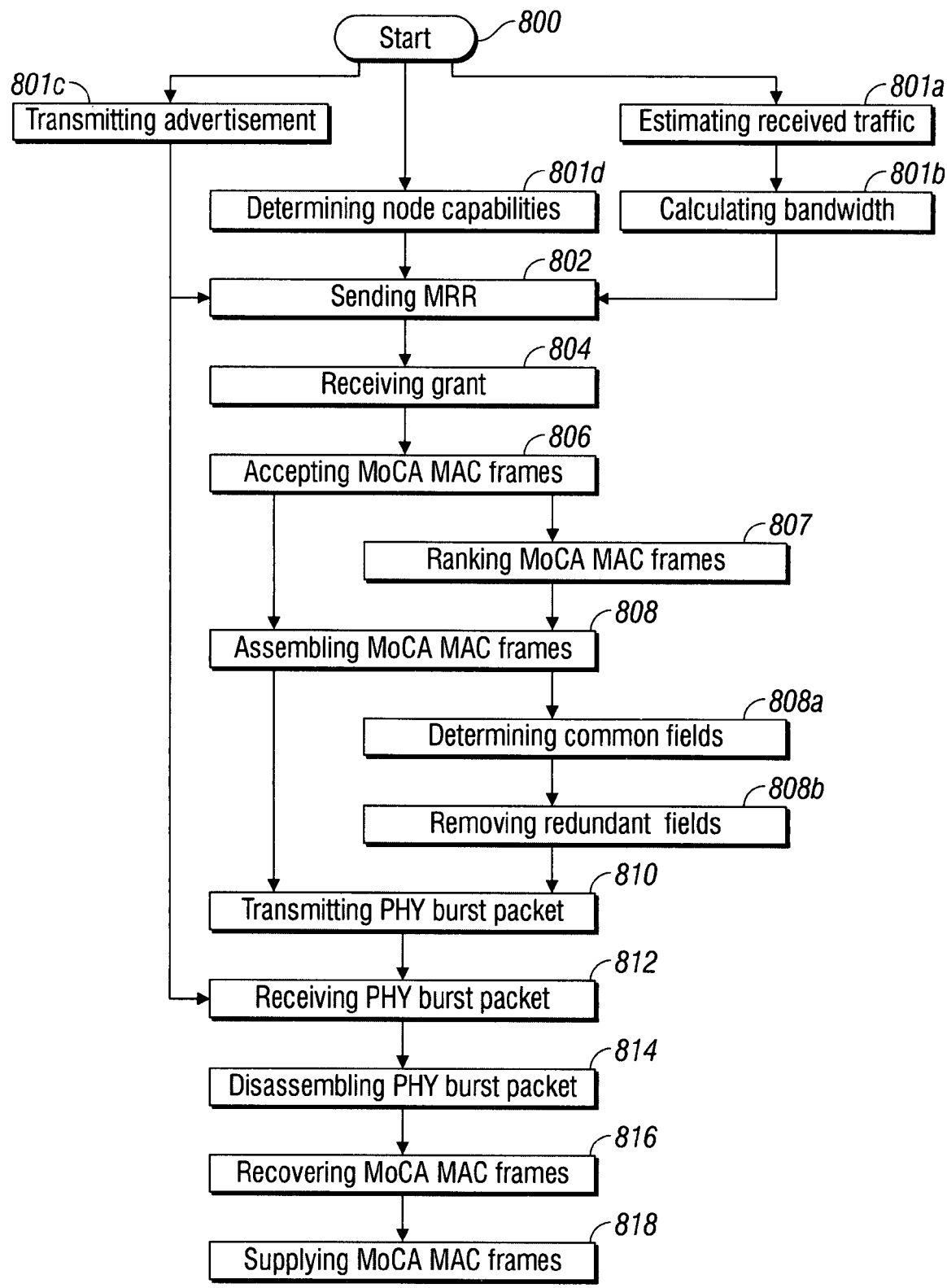
FIGS. 8A and 8B are flowcharts illustrating alternate expressions of a method for aggregating MoCA MAC frames.
Figure 8B:
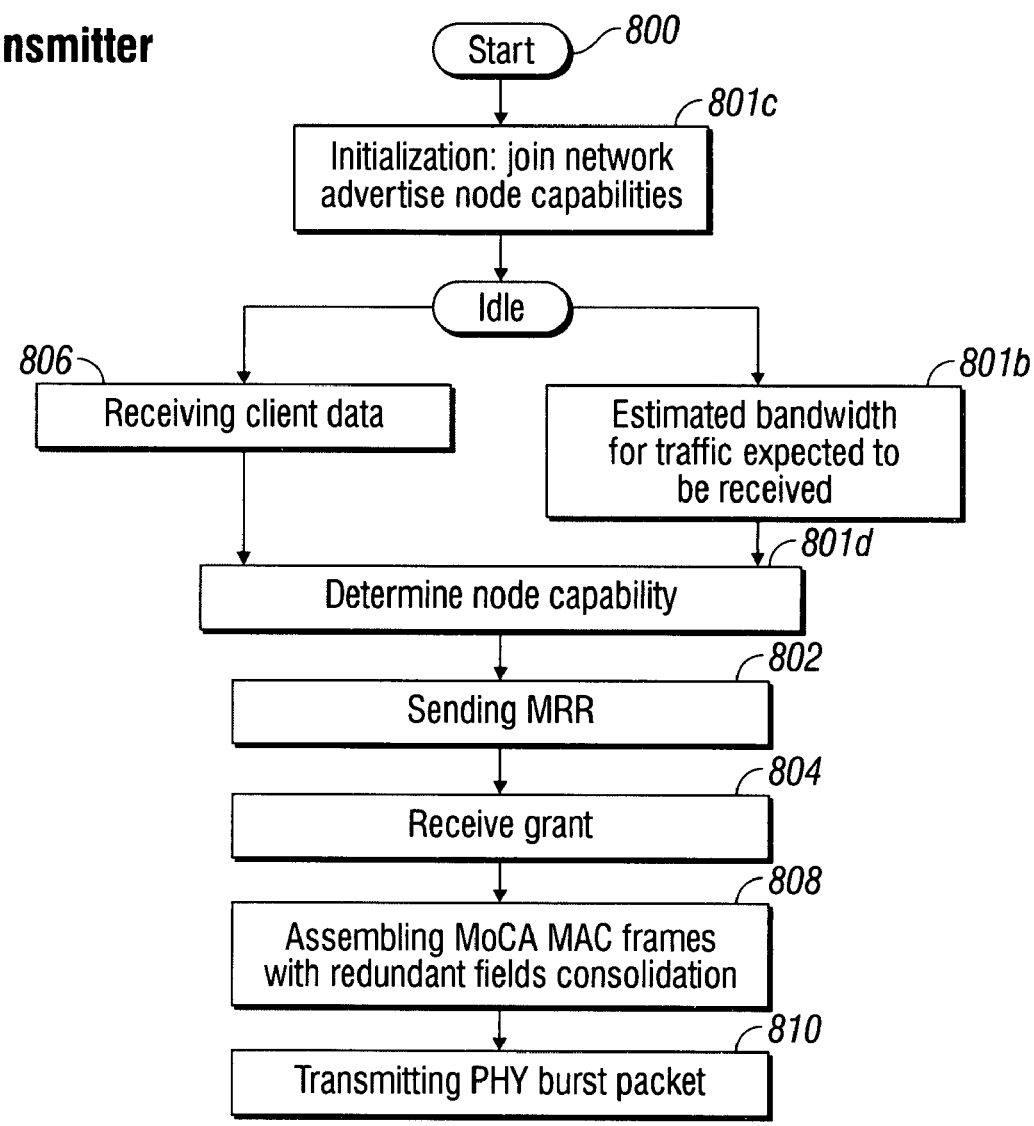
Figure 8B:
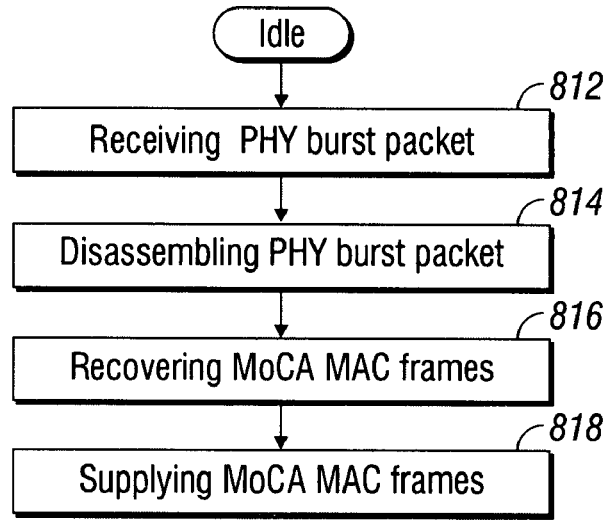

FIGS. 8A and 8B are flowcharts illustrating alternate expressions of a method for aggregating MoCA MAC frames. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 800.

Step 802 sends a Multiframe Reservation Request (MRR), requesting a transmission time slot. Step 804 receives a grant in response to the MRR. Step 806 accepts a plurality of MoCA MAC frames. Step 808 assembles the plurality of MoCA MAC frames in a PHY burst packet. Step 810 transmits the PHY burst packet in the granted time slot.

In one aspect, accepting the plurality of MoCA MAC frames in Step 806 includes accepting a plurality of MoCA MAC frames addressed to a first node. Then, Step 801*d* determines that the first node is capable of handling a PHY burst packet, and Step 810 transmits the PHY burst packet to the first node. In another aspect, Step 806 accepts a plurality of MoCA MAC frames addressed to a first plurality of nodes. Then, Step 801*d* determines that each node in the first plurality of nodes is capable of handling a PHY burst packet, and Step 810 broadcasts the PHY burst packet to the first plurality of nodes.

In one variation, Step 801*a* estimates the amount of received user traffic, and Step 801*b* calculates a required bandwidth. Then, sending the MRR in Step 802 includes sending a MRR responsive to the required bandwidth calculation. In another variation, Step 807 ranks the accepted MoCA MAC frames in accordance to a priority. Then, assembling the MoCA MAC frames in the PHY burst packet in Step 808 includes assembling MoCA MAC frames in response to the priority ranking. Although not specifically shown, the method may also estimate the ranking of MoCA MAC frames to be received, and send an MRR responsive to the ranking to the MoCA frames that are expected.

In one aspect, assembling the PHY burst packet includes substeps. Step 808*a* determines the existence of common fields shared between MoCA MAC frames. Step 808b removes redundant fields from the PHY burst packet.

In a different aspect, upon initialization, Step 801c transmits a message advertising PHY burst packet handling capabilities. Step 812 receives a PHY burst packet from the second node. Step 814 disassembles the PHY burst packet. Step 816 recovers a plurality of MoCA MAC frames, and Step 818 supplies the plurality of MoCA MAC frames (to the MAC layer).

Figure 9A:
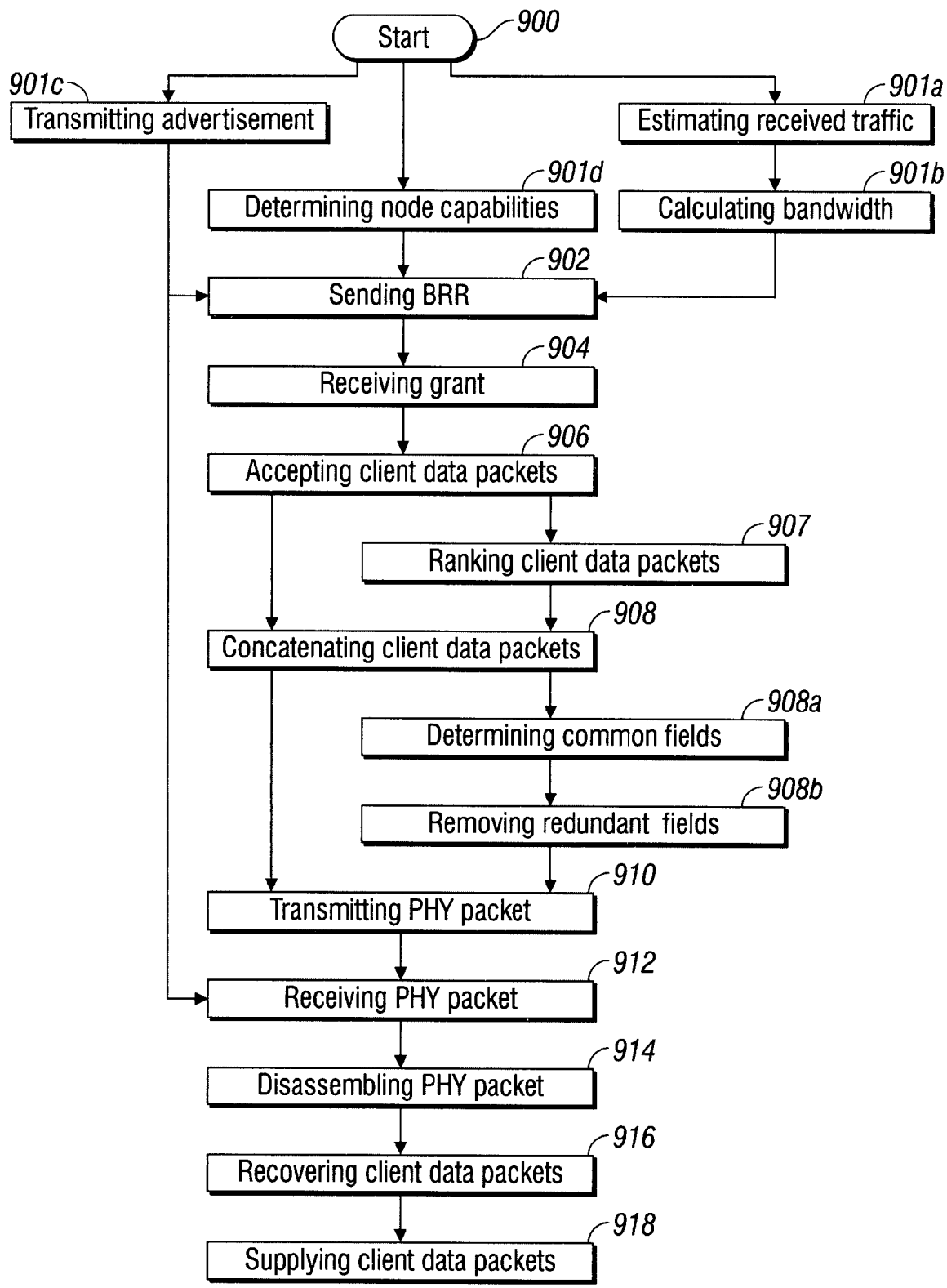
FIGS. 9A and 9B are flowcharts illustrating alternate expressions of a method for bundling client data packets into a MoCA MAC frame.
Figure 9B:
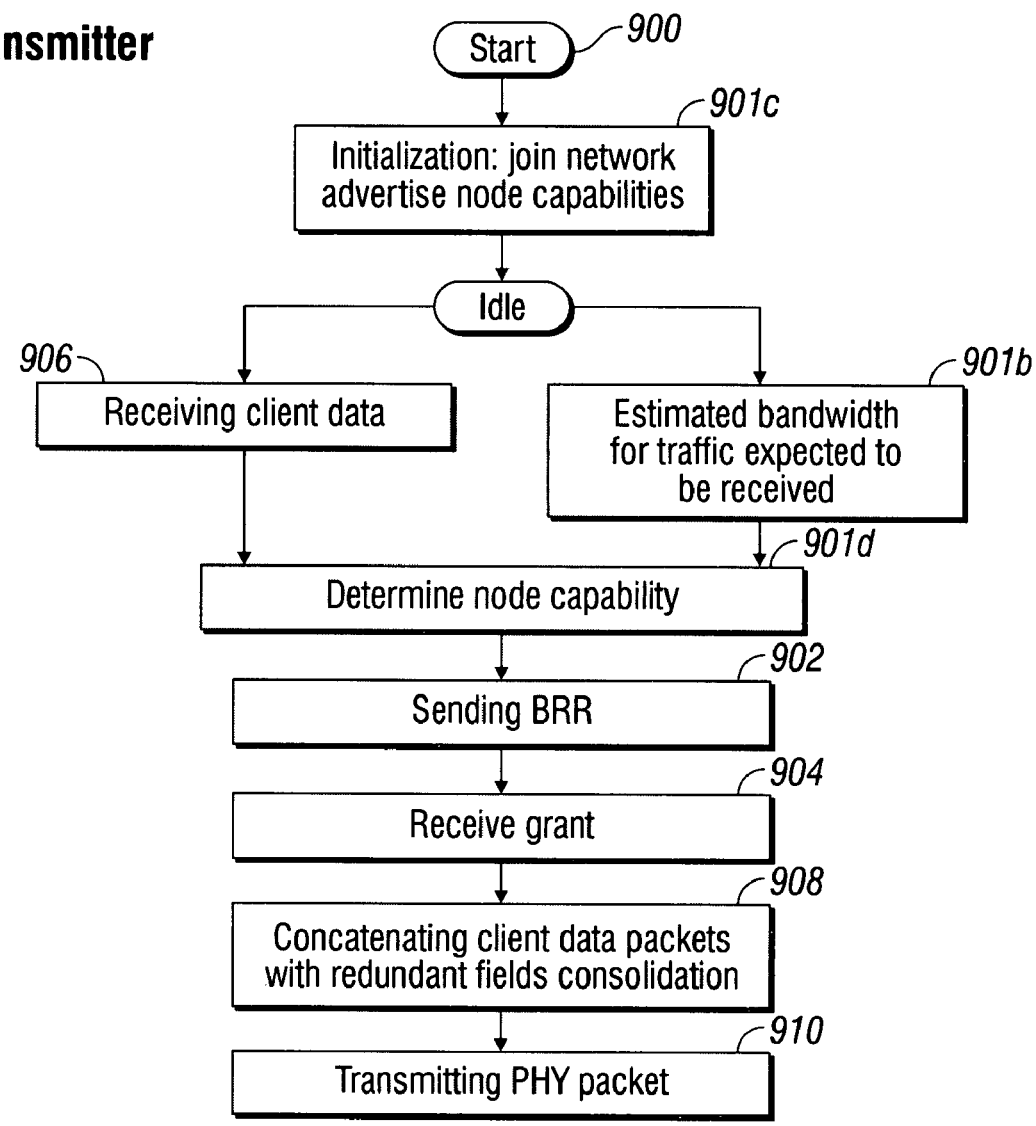

FIGS. 9A and 9B are flowcharts illustrating alternate expressions of a method for bundling client data packets into a MoCA MAC frame. The method starts at Step 900. Step 902 sends a Bundledpacket Reservation Request (BRR), requesting a transmission time slot. Step 904 receives a grant in response to the BRR. Step 906 accepts a plurality of client data packets. Step 908 concatenates the plurality of client data packets into a bundled MoCA MAC frame. Step 910 transmits the bundled MoCA MAC frame in a PHY packet in the granted time slot.

In one aspect, accepting the plurality of client data packets in Step 906 includes accepting a plurality of client data packets destined to a first node. Step 901d determines that the first node is capable of handling a bundled MoCA MAC frame, and Step 910 transmits the PHY packet to the first node. In another aspect, Step 906 accepts a plurality of client data packets destined to a first plurality of nodes. Then, Step 901d determines that each node in the first plurality of nodes is capable of handling a bundled MoCA MAC frame, and Step 910 broadcasts the PHY packet to the first plurality of nodes.

In a different aspect, Step 901a estimates an amount of received user traffic. Step 901b calculates a required bandwidth. Then, sending the BRR in Step 902 includes sending the BRR in response to the required bandwidth calculation. In one variation Step 907 ranks the accepted client data packets in accordance to a priority. Then, concatenating the plurality of client data packets into the bundled MoCA MAC frame in Step 908 includes concatenating the client data packets in response to the priority ranking. Although not specifically shown, the method may also estimate the ranking of client data packets to be received, and send a BRR responsive to the ranking to the client data packets that are expected.

In one aspect, concatenating the plurality of client data packets into the bundled MoCA MAC frame includes substeps. Step 908a determines the existence of common fields shared between client data packets. Step 908b removes redundant fields from the bundled MoCA MAC frame.

In a different aspect, upon initialization Step 901c transmits a message advertising bundled MoCA MAC frame handling capabilities. Step 912 receives a PHY packet from the second node. Step 914 disassembles the PHY packet. Step 916 recovers a plurality of client data packets. Step 918 supplies the plurality of client data packets (to upper layers).

Systems and methods for aggregating MoCA MAC frames have been presented, along with the concatenation of client data packets into bundled MoCA MAC frames. Examples have been given to illustrate the invention, but the invention is not limited to merely these examples. Other variations and embodiments of the invention will occur to those skilled in the art.

We claim:

1. A method for aggregating Multimedia over Coax Alliance (MoCA) Medium Access Control (MAC) frames, the method comprising:
   estimating by an aggregation module an amount of user traffic that is expected to be received within a certain period of time;
   calculating by the by an aggregation module a required bandwidth;
   sending, by an aggregation module's PHY interface, a Multiframe Reservation Request (MRR), requesting a transmission timeslot matching the bandwidth calculation, in response to the expected rate of received user traffic;
   receiving, by an aggregation module's PHY interface, a grant in response to the MRR;
   accepting, by an aggregation module's MAC interface, a plurality of MoCA MAC frames;
   assembling by an aggregation module the plurality of MoCA MAC frames in a physical layer (PHY) burst packet; and
   transmitting by a PHY transmitter the PHY burst packet in the granted time slot.

2. The method of claim 1, wherein accepting the plurality of MoCA MAC frames includes accepting the plurality of MoCA MAC frames addressed to a first node; the method further comprising:
   determining that the first node is capable of handing the PHY burst packet; and
   wherein transmitting the PHY burst packet includes transmitting the PHY burst packet to the first node.

3. The method of claim 1, wherein accepting the plurality of MoCA MAC frames includes accepting the plurality of MoCA MAC frames addressed to a first plurality of nodes; the method further comprising:
   determining that each node in the first plurality of nodes is capable of handling the PHY burst packet; and
   wherein transmitting the PHY burst packet includes broadcasting the PHY burst packet to the first plurality of nodes.

4. The method of claim 1, further comprising:
   ranking the accepted MoCA MAC frames in accordance to a priority; and
   wherein assembling the MoCA MAC frames in the PHY burst packet includes assembling MoCA MAC frames in response to the priority ranking.

5. The method of claim 1 wherein assembling the PHY burst packet includes:
   determining the existence of common fields shared between MoCA MAC frames; and
   removing redundant fields from the PHY burst packet.

6. The method of claim 1, further comprising:
   upon initialization, transmitting a message advertising PHY burst packet handling capabilities;
   receiving the PHY burst packet from a second node; disassembling the PHY burst packet; recovering the plurality of MoCA MAC frames; and, supplying the plurality of MoCA MAC frames.

7. A method for bundling client data packets into a Multimedia over Coax Alliance (MoCA) Medium Access Control (MAC) frame, the method comprising:
   estimating by a packetbundle module an amount of user traffic that is expected to be received within a certain period of time;
   calculating by a packetbundle module a required bandwidth; and
   sending, by a packetbundle module's PHY interface, a Bundledpacket Reservation Request (BRR), requesting a transmission time slot matching the bandwidth calculation, in response to the expected rate of received user traffic;
   receiving, by a packetbundle module's PHY interface, a grant in response to the BRR;

accepting, by a packetbundle module's MAC interface, a plurality of client data packets;

concatenating by a packetbundle module the plurality of client data packets into a bundled MoCA MAC frame; and transmitting by a PHY transmitter the bundled MoCA MAC frame in a physical layer (PHY) packet in the granted time slot.

8. The method of claim 7, wherein accepting the plurality of client data packets includes accepting the plurality of client data packets destined to a first node;

the method further comprising:

determining that the first node is capable of handling the bundled MoCA MAC frame; and wherein transmitting the PHY packet includes transmitting the PHY packet to the first node.

9. The method of claim 7, wherein accepting the plurality of client data packets includes accepting the plurality of client data packets destined to a first plurality of nodes; the method further comprising:

determining that each node in the first plurality of nodes is capable of handling bundled MoCA MAC frame; and wherein transmitting the PHY packet includes broadcasting the PHY packet to the first plurality of nodes.

10. The method of claim 7, further comprising:

ranking the accepted client data packets in accordance to a priority; and wherein concatenating the plurality of client data packets into the bundled MoCA MAC frame includes concatenating the client data packets in response to the priority ranking.

11. The method of claim 7 wherein concatenating the plurality of client data packets into the bundled MoCA MAC frame includes:

determining the existence of common fields shared between the plurality of client data packets; and, removing redundant fields from the bundled MoCA MAC frame.

12. The method of claim 7, further comprising:

upon initialization, transmitting a message advertising bundled MoCA MAC frame handling capabilities;

receiving the PHY packet from a second node; disassembling the PHY packet;

recovering the plurality of client data packets; and supplying the plurality of client data packets.

13. A Multimedia over Coax Alliance (MoCA) system for aggregating Medium Access Control (MAC) frames, the system comprising:

an aggregation module estimating an amount of user traffic that is expected to be received within a certain period of time and calculating a required bandwidth, the aggregation module having a physical (PHY) layer interface to supply a Multiframe Reservation Request (MRR) requesting a transmission time slot matching the bandwidth calculation, in response to the expected rate of received user traffic, and a MAC layer interface to accept a plurality of MoCA MAC frames, the aggregation module assembling the plurality of MoCA MAC frames and supplying a PHY burst packet at the PHY layer interface; and a PHY transceiver having an aggregation layer interface to accept the MRR and the PHY burst packet, and a network interface to transmit the PHY burst packet in the transmission time slot granted in response to the MRR.

14. The system of claim 13, wherein the aggregation module accepts the plurality of MoCA MAC frames addressed to a first node, and determines that the first node is capable of handling the PHY burst packet; and wherein PHY transceiver transmits the PHY burst packet to the first node.

15. The system of claim 13, wherein the aggregation module accepts the plurality of MoCA MAC frames addressed to a first plurality of nodes, and determines that each node in the first plurality of nodes is capable of handling the PHY burst packet; and wherein the PHY transceiver broadcasts the PHY burst packet to the first plurality of nodes.

16. The system of claim 13, wherein the aggregation module ranks the accepted MoCA MAC frames in accordance to a priority, and assembles MoCA MAC frames in response to the priority ranking.

17. The system of claim 13 wherein the aggregation module determines the existence of common fields shared between the plurality of MoCA MAC frames, and removes redundant fields from the PHY burst packet.

18. The system of claim 13, wherein the PHY transceiver transmits a message advertising PHY burst packet handling capabilities and subsequently receives the PHY burst packet from a second node, and supplies the PHY burst packet to the aggregation module; and wherein the/aggregation module disassembles the PHY burst packet, recovers the plurality of MoCA MAC frames, and supplies the plurality of MoCA MAC frames-via the MAC layer interface.

19. A Multimedia over Coax Alliance (MoCA) system for bundling client data packets into a Medium Access Control (MAC) frame, the system comprising:

a packetbundle module estimating an amount of user traffic that is expected to be received within a certain period of time and calculating a required bandwidth, the packetbundle module having a MAC layer interface to supply a Bundledpacket Reservation Request (BRR) requesting a transmission time slot matching the bandwidth calculation, in response to the expected rate of received user traffic, and a Convergence layer interface to accept a plurality of client data packets, the packetbundle module concatenating the plurality of client data packets, which are supplied at the MAC layer interface;

a MAC module having a packetbundle layer interface to accept the BRR and a PHY level interface to supply the BRR and a PHY packet including a bundled MoCA MAC frame; and a PHY transceiver having a MAC layer interface to accept the BRR and PHY packet, and a network interface to supply the PHY packet in the transmission time slot granted in response to the BRR.

20. The system of claim 19, wherein the packetbundle module accepts the plurality of client data packets destined to a first node, and determines that the first node is capable of handling the bundled MoCA MAC frame; and wherein the PHY transceiver transmits the PHY packet to the first node.

21. The system of claim 19, wherein the packetbundle module accepts the plurality of client data packets destined to a first plurality of nodes, and determines that each node in the first plurality of nodes is capable of handling the bundled MoCA MAC frame; and wherein the PHY transceiver broadcasts the PHY packet to the first plurality of nodes.

22. The system of claim 19 wherein the packetbundle module ranks the accepted client data packets in accordance to a priority, and concatenates the plurality of client data packets in response to the priority ranking.

23. The system of claim 19 wherein the packetbundle module determines the existence of common fields shared between the plurality of client data packets and removes redundant fields from the bundled MoCA MAC frame.

24. The system of claim 19, wherein the PHY transceiver transmits a message advertising bundled MoCA MAC frame capabilities upon joining the network, the PHY transceiver subsequently receiving the PHY packet from a second node, and supplying the PHY packet to the MAC module;

wherein the MAC module disassembles the PHY packet; and wherein the packetbundle module receives the concatenated client data packets from the MAC module, recovers the plurality of client data packets, and supplies the plurality of client data packets via the convergence layer interface.

\* \* \* \* \*

UNITED STATES PATENT AND TRADEMARK OFFICE
CERTIFICATE OF CORRECTION

PATENT NO. : 7,817,642 B2
APPLICATION NO. : 11/825087
DATED : October 19, 2010
INVENTOR(S) : Tracy Xiaoming Ma et al.

It is certified that error appears in the above-identified patent and that said Letters Patent is hereby corrected as shown below:

Column 11, line 62, claim 1 should read:

1. A method for aggregating Multimedia over Coax Alliance (MoCA) Medium Access Control (MAC) frames, the method comprising:
estimating by an aggregation module an amount of user traffic that is expected to be received within a certain period of time;
calculating by the aggregation module a required bandwidth;
sending, by the aggregation module's PHY interface, a Multiframe Reservation Request (MRR), requesting a transmission time slot matching the bandwidth calculation, in response to the expected rate of received user traffic;
receiving, by the aggregation module's PHY interface, a grant in response to the MRR;
accepting, by the aggregation module's MAC interface, a plurality of MoCA MAC frames;
assembling by the aggregation module the plurality of MoCA MAC frames in a physical layer (PHY) burst packet; and,
transmitting by a PHY transmitter the PHY burst packet in the granted time slot.

Column 12, line 53, claim 7 should read:

7. A method for bundling client data packets into a Multimedia over Coax Alliance (MoCA) Medium Access Control (MAC) frame, the method comprising:
estimating by a packetbundle module an amount of user traffic that is expected to be received within a certain period of time;
calculating by the packetbundle module a required bandwidth; and,
sending, by the packetbundle module's PHY interface, a Bundledpacket Reservation Request (BRR), requesting a transmission time slot matching the bandwidth calculation, in response to the expected rate of received user traffic;
receiving, by the packetbundle module's PHY interface, a grant in response to the BRR;
accepting, by the packetbundle module's MAC interface, a plurality of client data packets;
concatenating by the packetbundle module the plurality of client data packets into a bundled MoCA MAC frame; and,
transmitting by a PHY transmitter the bundled MoCA MAC frame in a physical layer (PHY) packet in the granted time slot.

Signed and Sealed this

Twenty-first Day of December, 2010

David J. Kappos
*Director of the United States Patent and Trademark Office*